United States Patent [19]

Ikenoue et al.

[11] Patent Number: 4,524,413

[45] Date of Patent: * Jun. 18, 1985

[54] AC RECTIFIER HAVING SEMI-CONDUCTOR ACTIVE RECTIFYING ELEMENT

[75] Inventors: Tsuneo Ikenoue, 14-6, Ichiban-cho 1-chome, Sendai-shi, Miyagi; Shin-yng Liu, Miyagi; Naoki Arai, Tokyo; Shuichi Umemoto, Kanagawa, all of Japan

[73] Assignees: Tsuneo Ikenoue; Tohoku Ricoh Co. Ltd., both of Miyagi; Stanley Electric Co., Ltd.; Micron Kiki Co., Ltd., both of Tokyo, all of Japan

[*] Notice: The portion of the term of this patent subsequent to Oct. 26, 1999 has been disclaimed.

[21] Appl. No.: 416,315

[22] Filed: Sep. 9, 1982

Related U.S. Application Data

[63] Continuation-in-part of Ser. No. 216,923, Dec. 16, 1980, Pat. No. 4,356,541.

[30] Foreign Application Priority Data

Dec. 19, 1979 [JP] Japan ............................ 54-165011

[51] Int. Cl.³ ............................................ H02M 7/217
[52] U.S. Cl. ...................................... 363/127; 363/53
[58] Field of Search ..................... 363/20, 21, 53, 70, 363/89, 127, 15; 323/289

[56] References Cited

U.S. PATENT DOCUMENTS

| 3,735,235 | 5/1973 | Hamilton et al. | 323/289 |
| 3,909,700 | 9/1975 | Ferro | 363/127 |
| 3,940,682 | 2/1976 | Park et al. | 363/127 |
| 4,189,764 | 2/1980 | Snyder | 363/21 |
| 4,356,541 | 10/1982 | Ikenoue et al. | 363/127 |

*Primary Examiner*—William H. Beha, Jr.
*Attorney, Agent, or Firm*—Burgess, Ryan & Wayne

[57] ABSTRACT

A rectifier using a semiconductor active element as a rectifying element is connected through an overvoltage protection circuit to a terminal voltage comparator for comparing the input voltage and the output voltage thereof. A pulse control circuit is connected to the control terminal of the active element for controlling the same in response to the output from the terminal voltage comparator. Thus, the rectifier can operate at high frequencies with a high degree of efficiency.

3 Claims, 5 Drawing Figures

AC RECTIFIER HAVING SEMI-CONDUCTOR ACTIVE RECTIFYING ELEMENT

CROSS-REFERENCE TO RELATED APPLICATION

This is a continuation-in-part of co-pending application Ser. No. 216,923, filed Dec. 16, 1980, now issued as U.S. Pat. No. 4,356,541.

BACKGROUND OF THE INVENTION

The present invention relates to a rectifier of the type in which a semiconductor active element such as a transistor is used as a rectifying element.

In general, rectification losses are dependent upon the characters or properties of not only rectifying elements themselves but also their associated circuits. The characteristics or properties of the rectifying elements which will affect the rectification losses are divided in general into the static or steady-state characteristics or properties such as the forward voltage drop, reverse current and so on and the transient characteristics or properties observed during a turn-on time and a turn-off time. The circuit characteristics or properties mainly cause high-frequency losses. Especially when the output voltage of a rectifier is low, the forward voltage drop will adversely affect the rectification efficiency. When the reverse recovery time, which is one of the transient characteristics or properties, becomes comparable with the period of the input voltage, its effects on the rectification efficiency will not remain negligible. As a consequence, when the input voltage or current rapidly changes in level at high frequencies as does a rectangular voltage or current, the adverse effects due to the transient characteristics or properties of a rectifying element used must be taken into consideration.

In the case of a rectifier which rectifies a current at a low frequency and especially at a low voltage such as a commercial power supply, the only requirement for attaining a high rectification efficiency is that the forward voltage drop is low. As a result, germanium diodes and Schottky barrier type diodes are widely used. In the case of the rectification of the high-frequency input current, the transient characteristics must be taken into consideration, so that the Schottky barrier type diodes and fast-recovery diodes are used. However, rectifying elements with a reverse recovery time of less than 50 ns are not available at present, so that it is extremely difficult to attain satisfactorily high efficiency at high frequencies. With respect to the forward voltage drop and the turn-off characteristics, the Schottky barrier type diodes are advantageous over the fast-recovery type diodes, but the former have a low breakdown voltage so that they can be used only when the input voltage is low. The forward voltage drop of these rectifying elements is, in general, of the order of 0.5 V at their maximum rated current. Even when they are used at 1/10 or 1/100 of the maximum rated current, the forward voltage drop is higher than 0.25 or 0.2 V, respectively. Because of the above-described characteristics of these rectifying elements, the rectification efficiency of the rectifiers and especially those operating at high frequencies is limited.

Mechanical rectifiers have been used as the power rectifiers for rectifying the voltages at relatively low frequencies such as a commercial frequency. Since a set of contacts is used, the mechanical rectifiers are advantageous over the semiconductor rectifying elements in that the forward voltage drop is low, but it is difficult to synchronize the closing and opening of the contacts with the zero crossing of an AC voltage, so that the operation is not stable especially at high frequencies. Thus, the mechanical rectifiers operating at high frequencies are not satisfactory in practice.

In the phase detectors (such as the phase discriminators, phase sensitive amplifiers, or lock-in amplifiers) used in communications equipment and measuring instruments, there have been used synchronized rectifiers utilizing the field-effect transistors or bipolar transistors and the combinations of synchronized circuits and amplifiers. However, synchronized rectifiers utilizing the semiconductor active elements have not been used as power rectifiers. It may be considered that the use of field-effect transistors and bipolar transistors as the rectifying elements is advantageous or optimum, because they have a low forward voltage drop, a high reverse resistance and excellent transient characteristics. However, in practice, when they are utilized in the synchronized power rectifiers, it is difficult to achieve a desired phase relationship between the input voltage and the control voltage because the load current, load resistance and load impedance are not necessarily maintained uniform. Especially, when the load is of the type having a capacitance or producing the counter electromotive force, the rectified current flows due to the instantaneous difference between the input and load voltages, so that an excessive reverse current flows into or an excessive overvoltage is applied to a semiconductor active element which is turned on. As a result, the active element is damaged. In the case of a circuit with a high interior impedance such as a phase detector for discriminating the phase by utilizing the reverse current which flows when the semiconductor active element is turned on, the active element can be utilized as a rectifying element in a relatively simple manner, but it is very difficult to utilize the semiconductor active elements as the rectifying elements in the power rectifiers in order to attain a higher degree of efficiency.

SUMMARY OF THE INVENTION

The present invention was made to overcome the above and other problems encountered in the prior art synchronized rectifiers and has for its object to provide a rectifier in which a semiconductor active element is used as a rectifying element so that the rectifier can operate at high frequencies with a higher degree of efficiency.

The rectifier in accordance with the present invention is featured in that a semiconductor active element is used as a rectifying element; a terminal voltage comparator is coupled to the semiconductor active element so as to detect the voltage difference across the semiconductor active element; and a pulse control circuit for controlling the semiconductor active element in response to the output from the terminal voltage comparator and timed pulses is coupled to the control terminal of the semiconductor active element so that the trailing edge of the control pulse being applied thereto can be suitably timed.

BRIEF DESCRIPTION OF THE DRAWINGS

Same reference numerals are used to designate similar parts throughout the figures.

DETAILED DESCRIPTION OF THE PRIOR ART

Figure 1:
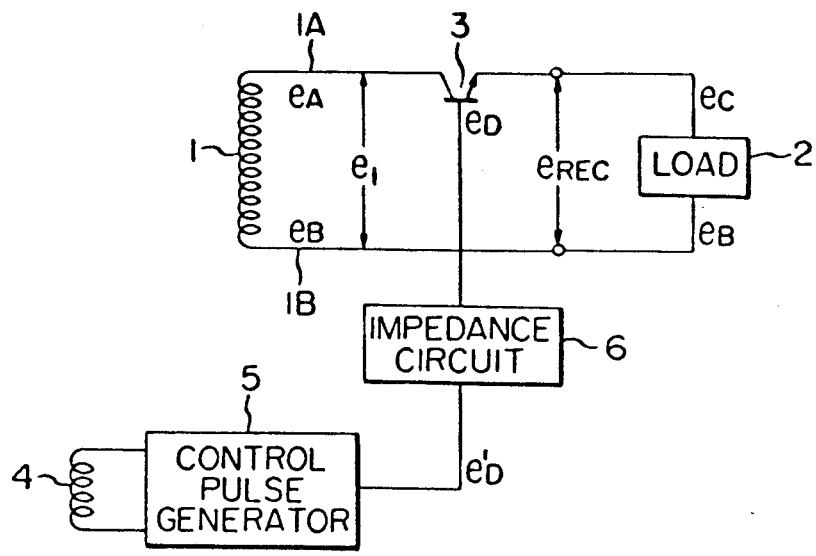
FIG. 1 is a block diagram of a prior art rectifier.
Figure 2:
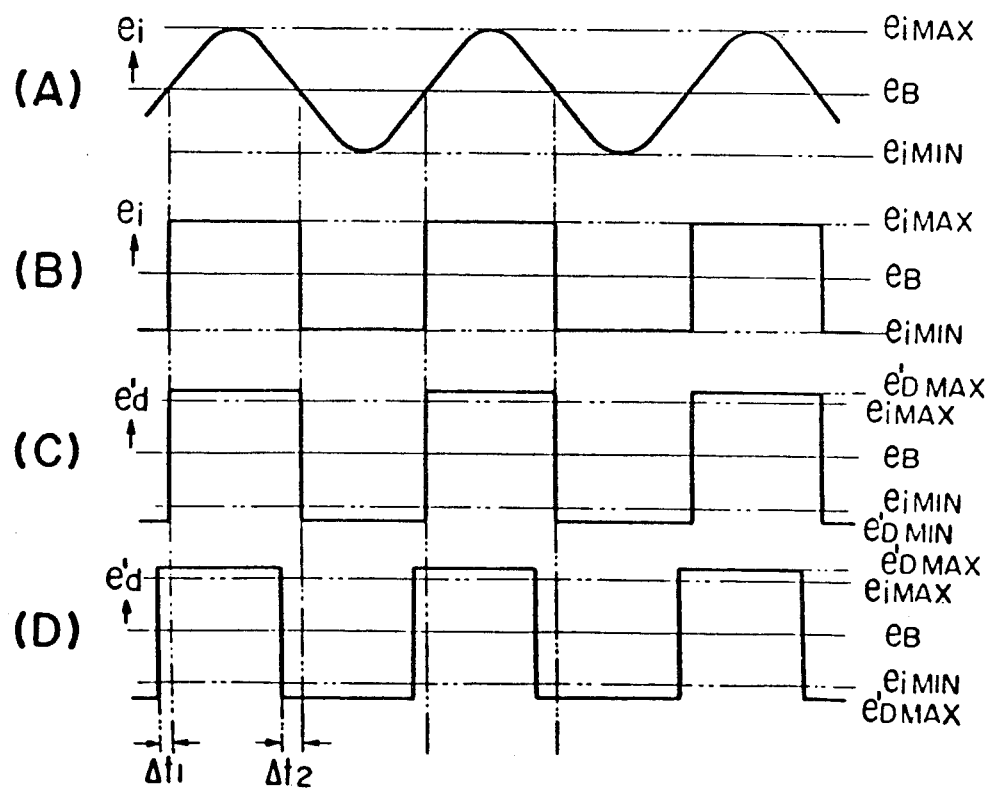
FIGS. 2(A)–2(D) are a timing chart used for the explanation of the mode of operation thereof.
Figure 3:
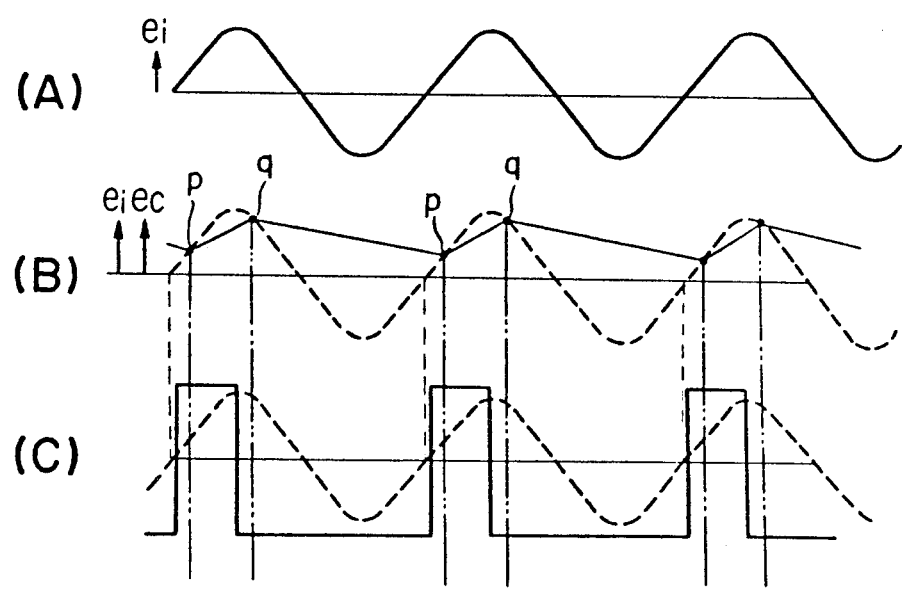
FIGS. 3(A)–3(C) are a timing chart used for the explanation of the desired operation of the rectifier shown in FIG. 1 and the rectifiers in accordance with the present invention.

FIGS. 1, 2 and 3

Referring to FIGS. 1 through 3, the reason why the use of the active elements as rectifying elements give rise to the above-described difficulties will be described in more detail. FIG. 1 shows a synchronized rectifier constructed by utilizing a semiconductive active element such as an NPN type transistor instead of a diode in a conventional half-wave rectifier. The positive terminal 1A of a secondary coil 1 of a main transformer, which is an input source, is connected through the collector and emitter of an NPN transistor 3, which is a rectifying element, to a load 2, and the negative terminal 1B of the secondary coil 1 is directly connected to the load 2. A transformer 4, which derives a suitable control voltage from the input voltage, is connected to a control pulse generator 5 which generates the control pulses which in turn are applied to the transistor 3. More specifically, the output terminal of the control pulse generator 5 is connected to the base of the transistor 3 through an impedance circuit 6 which adjusts the drive current applied to the base.

The input voltage $e_i$ is expressed by $$e_i = e_A - e_B$$

where
- $e_A$: the potential at the terminal 1A; that is, the input terminal of the secondary coil 1;
- $e_B$: the potential at the terminal 1B; that is, the input terminal of the secondary coil 1.

The rectifier output voltage $e_{REC}$ is expressed by $$e_{REC} = e_C - e_B$$

where
- $e_C$: the output terminal voltage; that is, the voltage applied to the positive terminal of the load 2.

When the transistor 3 is driven into the saturation, the collector-emitter voltage $V_{CE}(=e_A - e_C)$ is extremely small so that $$V_{CE} = e_A - e_C < e_D - e_C$$

where
- $e_D$: the base voltage of the transistor 3. Therefore, $$e_D > e_A$$

In order to quickly cut off the transistor 3 by applying a sufficient reverse current to the base, the control pulse generator 5 must be such that its output voltage; that is, the base voltage $e_D$ is lower than the output terminal voltages $e_A$ and $e_C$.

If the input voltage $e_i$ has a sinusoidal waveform as shown at (A) in FIG. 2 or a rectangular waveform as shown at (B) in FIG. 2, if the load 2 comprising a pure resistance, when the transistor 3 has a high transition response, and when the output $e_D'$ of the control pulse generator 5 has a maximum value $e_{D'\ max}$ higher than the maximum value $e_{i\ max}$ of the input voltage $e_i$ and a minimum value $e_{D'\ min}$ lower than the minimum value $e_{i\ min}$ of the input voltage $e_i$ and has a rectangular waveform synchronized with the input voltage $e_i$, then it becomes possible to attain the synchronized rectification without any loss. However, the collector current does not immediately respond to the input voltage; that is, the transistor has a turn-on time $t_{on}$ (the sum of the delay time $t_d$ and the rise time $t_r$) and the turn-off time $t_{off}$ (the sum of the storage time $t_s$ and the fall time $t_f$). It follows, therefore, that in order to eliminate losses, as shown at (D) in FIG. 2, the output voltage from the control pulse generator 5 must rise and fall, and furthermore, must be advanced in time by $\Delta t_1$ and $\Delta t_2$ relative to the waveform shown at (C). With the voltage waveform as shown at (C), the rise of the input voltage $e_i$ is delayed by the turn-on time $t_{on}$ of the transistor 3 so that the current efficiency drops. Because of the turn-off time $t_{off}$, the reverse current flows from the load 2 to the transistor 3 so that the rectification efficiency drops and the degradation results. When the load 2 has a capacitance and if the input voltage $e_i$ has not a regular rectangular waveform and changes from time to time as shown at (A) or has distorted waveforms and if the transistor 3 is driven with the control pulses as shown at (C) or (D), the reverse current flows into the transistor 3 when the latter is conducted. As a result, the transistor 3 will be damaged as will be described in detail below.

Referring to FIG. 3, the solid curve at (A) and the broken line curves at (B) and (C) denote the input voltage $e_i$. The solid-line curve at (B) shows the load voltage; that is, the rectifier output voltage $e_C$ when the load has a capacitance and the rectifying element is a diode. The points p and q at (B) shows the equipotential points at which the load voltage $e_C$ and the input voltage $e_i$ cross with each; that is, the points at which $e_i = e_C$. When $e_i > e_C$; that is, from the time point p to the point q, the output current flows into the load. Same is true when the transistor 3 or the active element is used instead of the diode as shown in FIG. 1. If the transistor 3 is driven with the control pulses as shown at (B) or (C), it remains conducted for a time interval except the time interval from p to q; that is, when $e_i < e_C$ and under this condition the reverse current flows into the transistor 3 because of the voltage $e_C$, so that the transistor 3 will be damaged and the rectification efficiency will drop to a considerable degree. Therefore, it follows that with the semiconductive active elements such as transistors, they must be correctly turned on and off at the time points p and q. Furthermore, when the turn-on and turn-off time of the transistor are taken into consideration, the control pulses must be so timed that they rise and fall slightly before the time points p and q, respectively. However, these equipotential points p and q vary from time to time depending upon the input voltage, waveform and frequency and on the load (its capacitance and the load current). As a result, it is extremely difficult and next to impossible in practice to design and construct the control pulse generator 5 which, in response to the input voltage, generates the control pulses in response to which the transistor 3 is turned on and off in synchronism with the equipotential points p and q.

DESCRIPTION OF THE PREFERRED EMBODIMENTS

Figure 4:
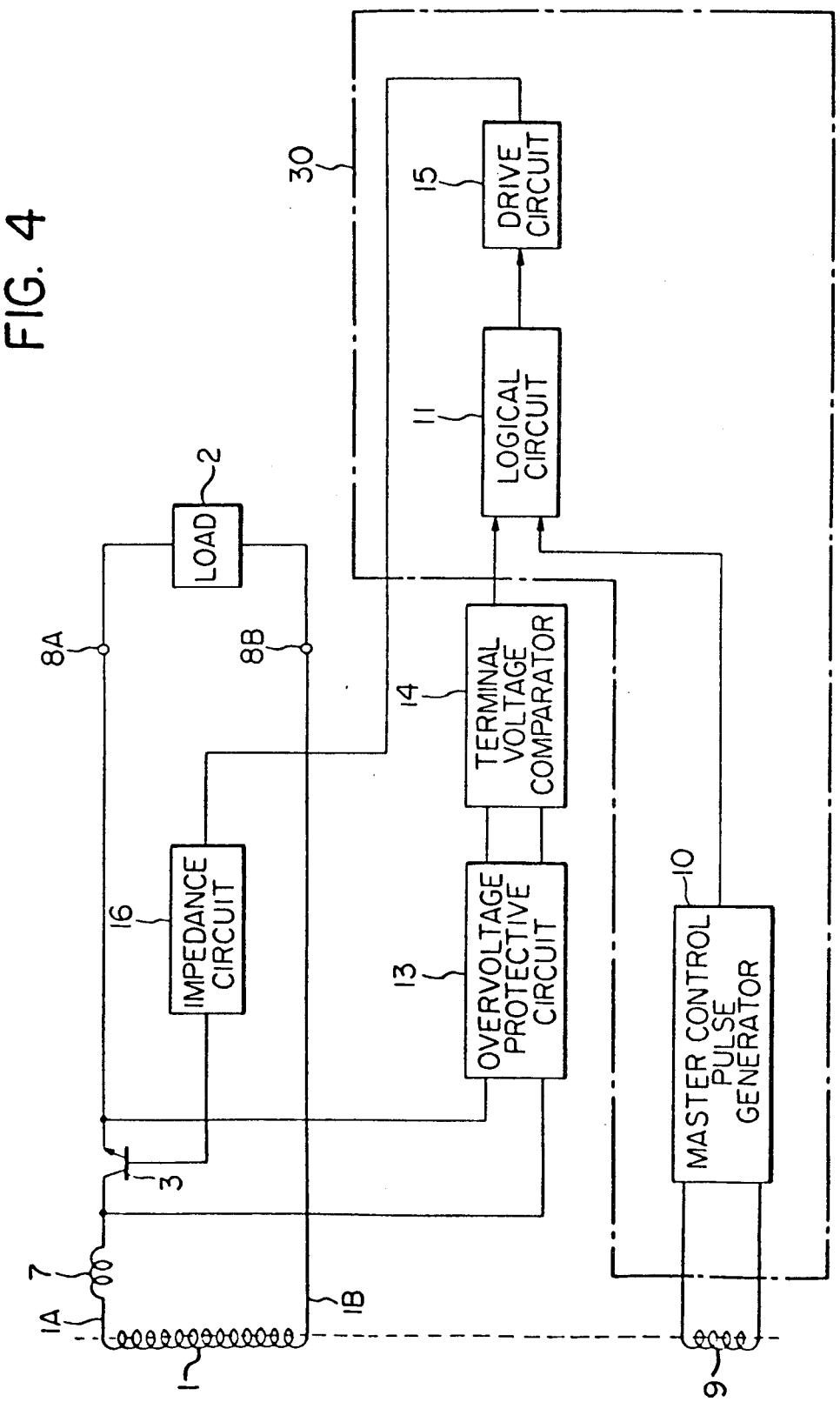
FIG. 4 is a block diagram of a first embodiment of a rectifier in accordance with the present invention.

First Embodiment, FIG. 4

The positive terminal 1A of the secondary coil 1 of the main transformer or input power source is connected through an inductor 7 having a very small inductance is connected to the collector of an NPN transistor 3, which is a semiconductor active element, and the collector is connected to the positive output terminal 8A which in turn is connected to one end of the load 2. The negative terminal 1B of the secondary coil 1 is connected to the negative output terminal 8B which in turn is connected to the other end of the load 2. A master control pulse source 9 which derives a master control pulse voltage in synchronism with the input voltage is connected to a main control pulse generator 10 which converts the output from the source 9 into a rectangular waveform and generates the master control pulses synchronized with the input voltage. The master control pulse generator 10 in turn is coupled to one input terminal of a logic circuit 11 which may be an AND or OR gate. The master pulse control generator 10 receives as an input the output from the secondary 9 of the input transformer 1, detects the polarity of the input voltage and reshapes it into a rectangular waveform. The output of the logic circuit 11 is connected to a drive circuit 15 the output of which in turn is coupled through a series-connected impedance circuit 16 to the base of the transistor 3. The master control pulse generator 10, the logic circuit 11 and the drive circuit 15 constitute a pulse control circuit 30 which controls the rectifying transistor 3 with the pulses in response to the output from the terminal voltage comparator 14.

The terminal voltage comparator 14 detects the equipotential point p at which the rising input voltage $e_i$ becomes equal to the output voltage $e_C$ and the equipotential point q at which the falling input voltage $e_i$ becomes equal to the output voltage $e_C$ and generates the control pulse the polarity of which causes the transistor 3 to turn on. This control pulse is applied to the other input terminal of the logic circuit 11 which is an AND or OR gate. The ENABLE pulse which causes the transistor 3 to turn on is applied to one input terminal of the logic circuit 11 during the time interval when the input voltage $e_i$ is positive. As a result, the logic circuit 11 generates the pulse output the polarity of which enables the transistor 3 between p and q. The output pulse from the logic circuit 11 is applied to the drive circuit 15 which in turn applies the drive pulse to the base of the transistor 3, so that the latter is turned on. Therefore, the transistor 3 is turned on at the point p when the input voltage $e_i$ is rising and turned off at the point q when the input voltage $e_i$ is falling. However, in practice, the transistor 3 has the turn-on time $t_{on}$ and the turn-off time $t_{off}$ so that the transistor 3 is turned on a little time later than the point p and turned off a little time later than the point q. The inductor 7 has a function of blocking the transient flow of reverse current into the transistor 3 from the point q to the time when the transistor 3 is completely turned off; that is, during the turn-off time.

In summary, according to the first embodiment of the present invention, the voltage between the collector and emitter of the transistor 3, which is a rectifying element, is detected so as to detect the points p and q. The drive pulse synchronized with these points p and q is generated so as to drive the transistor 3. The inductor 7 is connected in series to the transistor 3, so that the damages to and degradation of the transistor 3 due to the transient current and reverse current can be avoided, so that the stabilized operation of the rectifier is ensured. Thus, the present invention provides a high-efficiency rectifier utilizing a transistor as a rectifying element.

In the first embodiment, the inductor 7 having a very small inductance is inserted separately, but since the main function of the inductor 7 is to prevent the rapid current variation, any available inductance such as a leakage inductance from the transformer may be used as in the second embodiment to be described with reference to FIG. 5.

Figure 5:
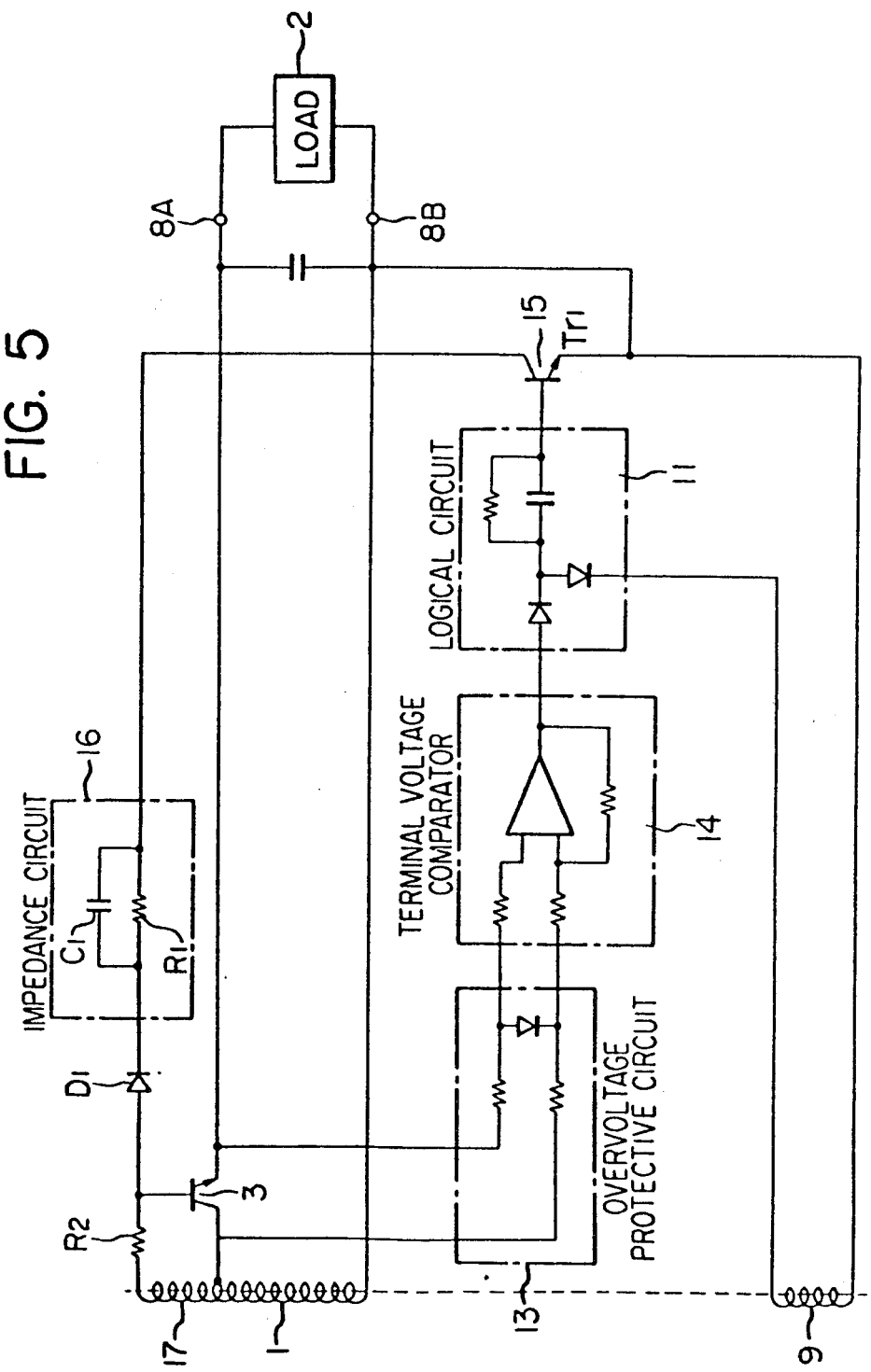
FIG. 5 is a block diagram of a second embodiment of the present invention.

Second Embodiment, FIG. 5

The second embodiment shown in FIG. 5 is substantially similar in construction except that a coil 17 is connected to the secondary coil 1 of the main transformer so that the power derived across the coil 17 is used as the base power for driving the transistor 3. The coil 17 is connected through a resistor $R_2$, a diode $D_1$ and an impedance circuit 16 comprising parallel-connected resistor $R_1$ and a capacitor $C_1$ to the collector of a transistor $Tr_1$ which corresponds to the drive circuit 15 in FIG. 4. The junction between the resistor $R_2$ and the diode $D_1$ is connected to the base of the transistor 3 which is a rectifying element. Except for the above-described arrangement, the overvoltage protective circuit 13, the terminal voltage comparator 14, and the logic circuit 11, which are all shown in detail as compared with FIG. 1, are substantially similar in construction and mode of operation so that no further description of them shall not be made.

Next, the mode of operation of the second embodiment will be briefly described. When the transistor $Tr_1$ is turned off, the base voltage of the transistor 3 rises, but when the former is turned on the base voltage drops so that the transistor 3 is turned off. The results of the experiments conducted by the inventors confirmed the fact that when the voltage across the coil 17 and the value of the resistor $R_2$ can be reduced to a minimum and a higher degree of efficiency can be ensured.

So far the present invention has been described in conjunction with the NPN transistor 3 as a semiconductor active element, but it is to be understood that PNP transistors may be equally used. Furthermore, FETs and MOS FETs may be also used. In addition, the present invention may be equally applied to the choke-input type rectifiers.

In summary, according to the present invention, a semiconductor active element is used as a rectifying element with a pulse control circuit. Accordingly, the synchronized rectification can be achieved in a simple manner and the damages to the active element by the reverse current and the overvoltage caused during the transition of the active element and the ever varying input and load conditions. Therefore, the characteristics of the semiconductor active elements can be fully utilized to attain a higher degree of efficiency. In addition, the synchronized rectifier in accordance with the present invention can operate at higher frequencies.

What is claimed is:

1. A rectifier for an AC input voltage, comprising:
   a semiconductor active rectifying element having two main terminals and a control terminal;

a terminal voltage comparator coupled to said main terminals for comparing the input voltage with the output voltage of said semiconductor active rectifying element; and a pulse control circuit comprising a master control pulse generator coupled to said terminal voltage comparator, an operational circuit and a drive circuit coupled to the control terminal of said semiconductor active element for controlling the same in response to the output from said master control pulse generator.

2. A rectifier for an AC input voltage, comprising:

a semiconductor active rectifying element having two main terminals and a control terminal;

a terminal voltage comparator coupled to said main terminals for comparing the input voltage with the output voltage of said semiconductor active rectifying element; and a pulse control circuit comprising a master control pulse generator coupled to said terminal voltage comparator, an operational circuit and a drive circuit coupled to the control terminal of said semiconductor active element for controlling the same in response to the output from said master control pulse generator, said pulse control circuit being so designed and constructed that when said terminal voltage comparator detects the time at which the rising input voltage to said semiconductor active rectifying element becomes equal to the rectified output voltage thereof, said pulse control circuit causes said semiconductor active element to turn on, and when said terminal voltage comparator detects the time at which the falling input voltage becomes equal to the output voltage, said pulse control circuit causes said semiconductor active element to turn off.

3. A rectifier for an AC input voltage, said rectifier being coupled to the secondary coil of a main transformer of a transformer isolation type DC-DC converter, said main transformer also having a primary coil comprising:

a semiconductor active rectifying element having a control terminal;

a terminal voltage comparator coupled to said semiconductor active rectifying element for comparing the input voltage with the output voltage of said semiconductor active rectifying element;

a pulse control circuit comprising a master control pulse generator coupled to said terminal voltage comparator, an operational circuit and a drive circuit coupled to the control terminal of said semiconductor active element for controlling the same in response to the output from said master control pulse generator, said pulse control circuit being so designed and constructed that when said terminal voltage comparator detects the time at which the rising input voltage to said parallel combination circuit becomes equal to the rectified output voltage thereof, said pulse control circuit causes said semiconductor active element to turn on.

* * * * *